US008179392B2

(12) United States Patent
Kida et al.

(10) Patent No.: US 8,179,392 B2
(45) Date of Patent: May 15, 2012

(54) PRE-CHARGE SYSTEM FOR ON GLASS LCD DRIVING CIRCUIT

(75) Inventors: Yoshitoshi Kida, Camberley (GB); Jarupoonphol Werapong, Atsugi (JP); Daisuke Ito, Camberley (GB); Takeya Takeuchi, Camberley (GB)

(73) Assignee: Sony Corporation, Tokyo (JP)

(*) Notice: Subject to any disclaimer, the term of this patent is extended or adjusted under 35 U.S.C. 154(b) by 805 days.

(21) Appl. No.: 12/348,234

(22) Filed: Jan. 2, 2009

(65) Prior Publication Data

US 2009/0174698 A1 Jul. 9, 2009

(30) Foreign Application Priority Data

Jan. 4, 2008 (GB) .................................. 0800154.7

(51) Int. Cl.
*G06F 3/038* (2006.01)

(52) U.S. Cl. ....................................... 345/212; 345/204

(58) Field of Classification Search .................. 345/204, 345/212
See application file for complete search history.

(56) References Cited

U.S. PATENT DOCUMENTS

| | | | | |
|---|---|---|---|---|
| 7,907,137 | B2 * | 3/2011 | Shirasaki et al. | 345/212 |
| 2003/0006955 | A1 | 1/2003 | Tsuchi | |
| 2004/0160404 | A1 | 8/2004 | Nakajima et al. | |
| 2004/0263453 | A1 * | 12/2004 | Yun et al. | 345/87 |
| 2006/0007251 | A1 * | 1/2006 | Park et al. | 345/690 |

* cited by examiner

*Primary Examiner* — Richard Hjerpe
*Assistant Examiner* — Sahlu Okebato
(74) *Attorney, Agent, or Firm* — Oblon, Spivak, McClelland, Maier & Neustadt, L.L.P.

(57) ABSTRACT

A driving circuit and a method of driving a liquid crystal display having an array of liquid crystal cells connected to a common line, a plurality of gate lines and a plurality of signal lines, each gate line being arranged to selectively enable a respective set of the liquid crystal cells such that signal lines connected to respective liquid crystal cells of a set can be used to charge respective liquid crystal cells of that set when that set is enabled by the respective gate line. At least some of the signal lines are selectively driven with the maximum level and the voltage on the at least some of the signal lines is monitored such that driving of the at least some of the signal lines with the maximum level ceases when the monitored voltage reaches a predetermined target value intermediate the minimum level and the maximum level.

19 Claims, 9 Drawing Sheets

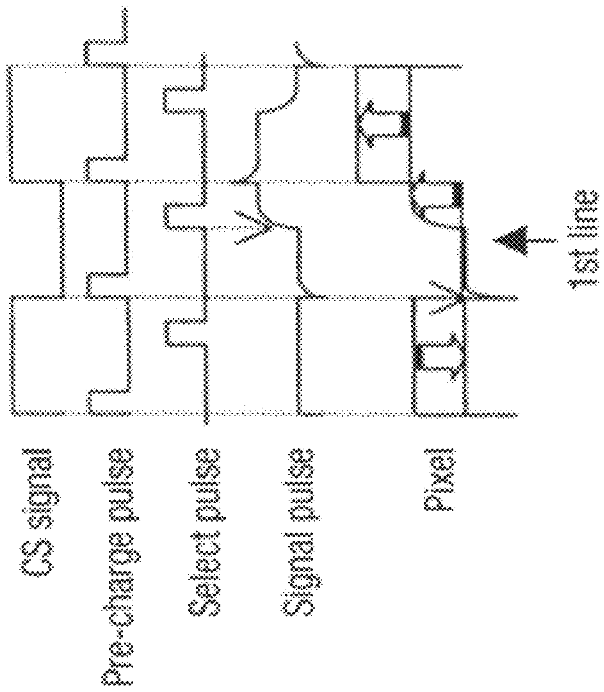
Fig.6a.
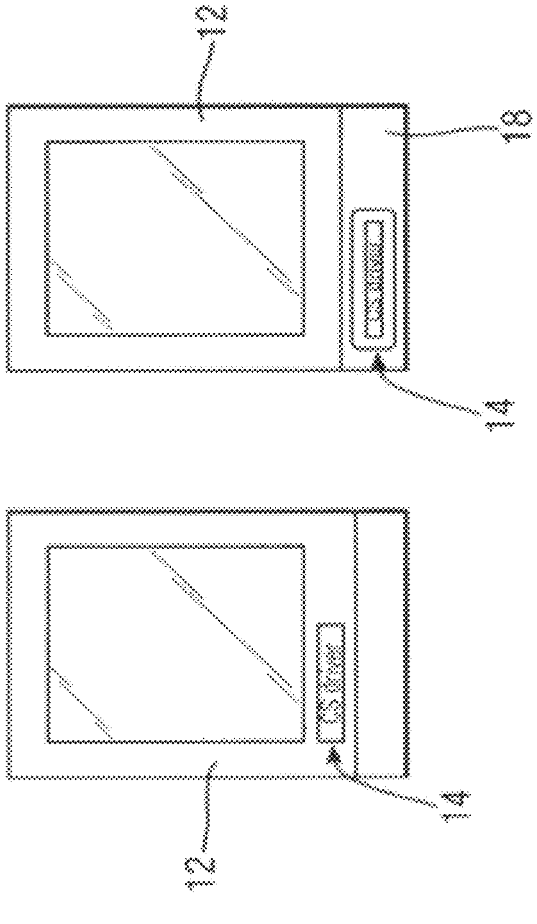

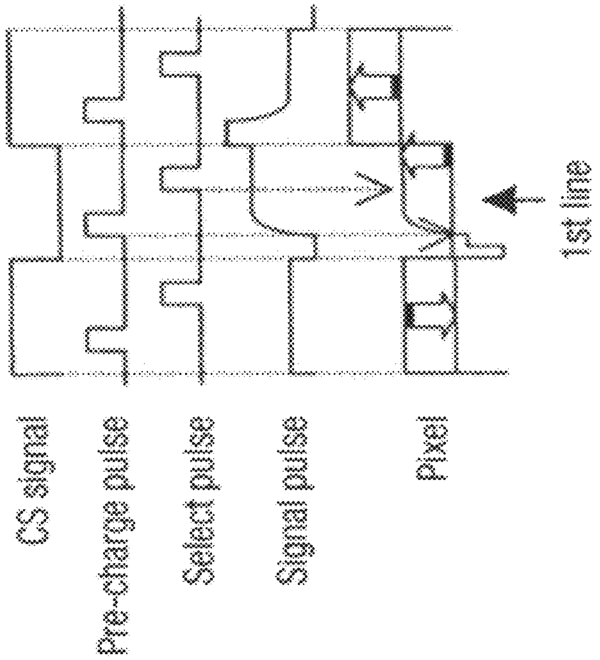
Fig.6b.
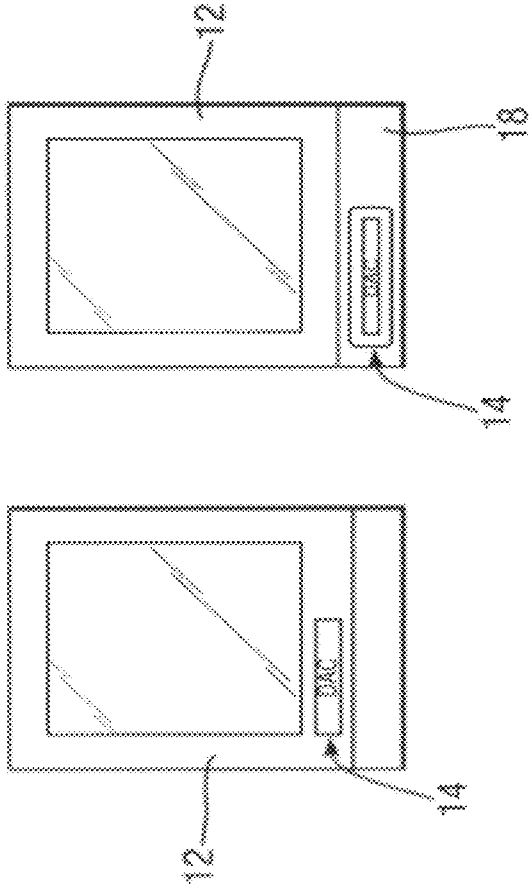

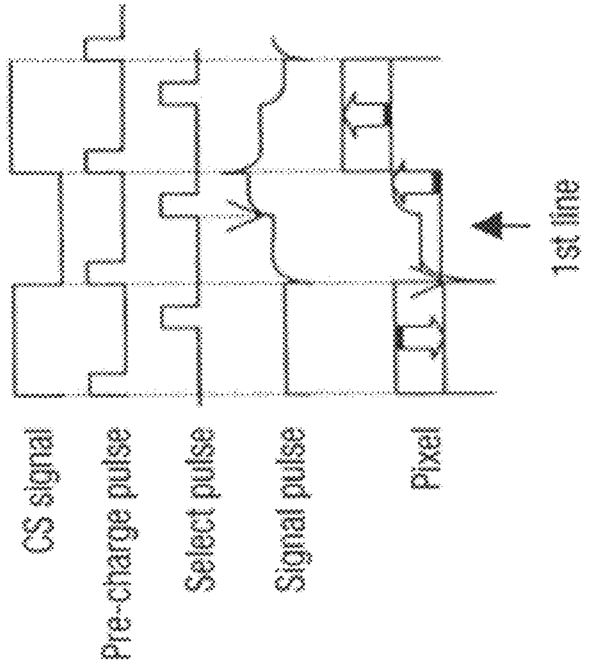
Fig.6c.
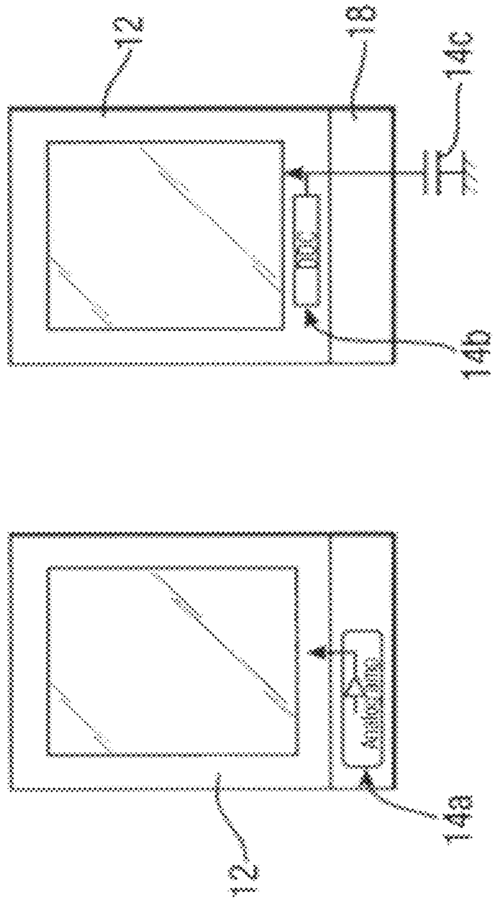

PRE-CHARGE SYSTEM FOR ON GLASS LCD DRIVING CIRCUIT

CROSS-REFERENCE TO RELATED APPLICATIONS

This application claims the benefit of priority under 35 U.S.C. §119 from the British Patent Application No. 0800154.7, filed Jan. 4, 2008, the entire contents of which are incorporated herein by reference.

BACKGROUND OF THE INVENTION

1. Field of the Invention

The present invention relates to a driving circuit for a liquid crystal display as well as a liquid crystal module including the driving circuit and a method of driving a liquid crystal display.

2. Description of the Related Art

Liquid crystal displays are well known using a two-dimensional array of liquid crystal cells in which the cells share a plurality of signal lines in one direction and are selectively enabled by gate lines in a perpendicular direction. Drive circuits are provided which use the gate lines to enable respective sets of liquid crystal cells. The signal lines are then used to provide video signal levels to the enabled cells to charge those cells to the level required to give those cells their desired brightness.

OBJECTS AND SUMMARY OF THE INVENTION

It is usual to group the liquid crystal cells together to form image pixels. Each image pixel would typically include three liquid crystal cells corresponding respectively to red, green and blue. The red, green and blue liquid crystal cells of a pixel are provided on the same gate line and, indeed, can be driven by the same video signal. In particular, with a gate line enabling all of the liquid crystal cells of the pixel, the video signal is provided first to the red liquid crystal cell by means of its signal line, then to the green liquid crystal cell by means of its signal line and finally to the blue liquid crystal cell by means of its signal line. It will be understood, therefore, that the video signal is divided into three consecutive parts corresponding respectively to the signal required for the red liquid crystal cell, the signal required for the green liquid crystal cell and the signal required for the blue liquid crystal cell.

In order to facilitate manufacture, it is desirable to form the driving circuit on the same glass plate as the liquid crystal display cell. To do this, it is known to use low-temperature polysilicon TFT for the simultaneous formation of the liquid crystal display and the driving circuit.

The present application recognises a desirability to be able to use liquid crystal display modules at low temperatures, for instance as low as minus 30° C. However, at such low temperatures, liquid crystal moves at a lower speed. There is a problem, therefore, that in the short time available to apply the video signal to the liquid crystal cells, the liquid crystal in those cells will not move sufficiently to achieve the desired brightness. Where the liquid crystal cells corresponding to different colours of a pixel are driven consecutively during one gate-enabled pulse, it will be appreciated that while the first liquid crystal cell to be driven has nearly the entire gate pulse in which its liquid crystal can move, the last liquid crystal cell to be driven has approximately only one third of the gate pulse in which its liquid crystal can move. Hence, at lower temperatures, colour imbalance can occur in the liquid crystal display.

There are also problems in providing appropriate circuitry on the same plate as the liquid crystal display in order to drive the liquid crystal cells at low temperatures.

According to the present invention, there is provided a method of driving a liquid crystal display having an array of liquid crystal cells connected to a common line, a plurality of gate lines and a plurality of signal lines, each gate line being arranged to selectively enable a respective set of the liquid crystal cells such that signal lines connected to respective liquid crystal cells of a set can be used to charge respective liquid crystal cells of that set when that set is enabled by the respective gate line. The method includes driving the common line with a common signal having selectively one of a first and a second level, driving the gate lines so as to selectively enable respective sets of liquid crystal cells, charging liquid crystal cells according to video signal levels varying between a minimum level and a maximum level, wherein, when the common line is driven with a common signal having the first level, the minimum level is the first level and the maximum level is the second level and, when the common line is driven with a common signal having the second level, the minimum level is the second level and the maximum level is the first level, and pre-charging liquid crystal cells connected to at least some of the signal lines prior to charging those liquid crystal cells according to the video signal levels by driving the at least some of the signal lines with the maximum level, monitoring the voltage on the at least some of the signal lines and ceasing driving the at least some of the signal lines with the maximum level when the monitored voltage reaches a predetermined target value intermediate the minimum level and the maximum level.

According to the present invention, there is also provided a driving circuit for a liquid crystal display module having an array of liquid crystal cells connected to a common line, a plurality of gate lines and a plurality of signal lines, each gate line being arranged to selectively enable a respective set of the liquid crystal cells such that signal lines connected to respective liquid crystal cells of a set can be used to charge respective liquid crystal cells of that set when that set is enabled by the respective gate line. The driving circuit includes a common output configured to drive the common line with a common signal having selectively one of a first level and a second level, a plurality of gate outputs configured to drive the gate lines so as to selectively enable the respective sets of liquid crystal cells, and a plurality of signal outputs configured to charge liquid crystal cells with video signal levels varying between a minimum level and a maximum level wherein, when the common signal has the first level, the minimum level is the first level and the maximum level is the second level and, when the common signal has the second level, the minimum level is the second level and the maximum level is the first level. The driving circuit further includes a switch circuit configured to selectively drive at least some of the signal outputs with the maximum level, a monitor circuit configured to monitor the voltage on the at least some of the signal outputs and to control the switch circuit to cease driving the at least some of the signal outputs with the maximum level when the monitored voltage reaches a predetermined target value intermediate the minimum level and the maximum level, and a control circuit configured to pre-charge liquid crystal cells by operating the switch circuit for the at least some of the signal outputs prior to charging the liquid crystal cells according to video signals with said video signal levels.

With a driving circuit provided in this manner, it is possible to pre-charge liquid crystal cells to an intermediate level, preferably a mid-point between the minimum level and the maximum level. When the actual video signal level is applied to those pre-charged liquid crystal cells, the liquid crystal in those cells has already been partly moved and it becomes easier, within a short period of time, to move the liquid crystal as desired to provide the desired brightness. Furthermore, the driving circuit is not required to produce the intermediate level itself such that simple manufacture of the driving circuit on the same plate as the liquid crystal display becomes possible. Because the signal lines and liquid crystal cells of the liquid crystal display will inherently have some capacitance, driving the signal outputs with the maximum level will not immediately result in the voltage level at the signal outputs and on the signal lines being at that maximum level. Instead, the voltage level will ramp up rapidly over time. The monitor circuit monitors that ramping and causes the switch circuit to disconnect the maximum level voltage from the relevant signal outputs.

In a preferred arrangement, the common line is provided by the plate on which the liquid crystal display is formed. The liquid crystal cells are arranged in a two-dimensional array with the gate lines arranged, for instance, horizontally and the signal lines arranged, for instance, vertically. Considering a single gate line enabling its respective set of liquid crystal cells for a gate pulse, where the liquid crystal cells in that set include liquid crystal cells corresponding to different colours to be driven consecutively within the gate pulse, it is only necessary to apply the pre-charge to those liquid crystal cells to be driven later in the gate pulse. Hence, the switch circuit need only drive at least some of the signal outputs with the maximum level and the monitor circuit need similarly only monitor those signal outputs.

The common signal has selectively either the first level or the second level because it is desirable with liquid crystal displays to drive the same liquid crystal cells of consecutive frames with opposite polarity. Thus, the driving circuit is preferably configured to alternate the common signal between the first level and the second level for consecutive uses of the array of liquid crystal cells such that, when each one of the gate lines is used to enable a respective set of liquid crystal cells, the common signal will have a different one of the first level and the second level to when that one of the gate lines was previously used to enable the respective set of liquid crystal cells.

For one frame, a liquid crystal cell could be driven with a positive polarity based on the first level of the common signal and, hence, have a video signal level somewhere between a minimum level corresponding to the first level and a maximum value corresponding to the second level. For the next frame, the common signal is changed to the second level, for instance more positive than said first level, and the same liquid crystal cell is driven with negative polarity. Thus, the video signal is provided negatively from a minimum level corresponding to the second level to a maximum level corresponding to the first level.

It is also desirable for adjacent lines of the video display to be driven with opposite polarity. Thus, for a liquid crystal display module in which the respective sets of liquid crystal cells are arranged side by side, the driving circuit is preferably configured to use the plurality of gate outputs so as to enable adjacent sets of liquid crystal cells consecutively one after the other and to alternate the common signal between the first level and the second level for adjacent sets of liquid crystal cells.

In this way, one line of the liquid crystal display corresponding to one set will be driven with a positive polarity from the first level whereas its one or two neighbouring and adjacent lines/sets will be driven with negative polarity with respect to the second level.

Preferably, the monitor circuit is connected to the switch circuit and to the at least some of the signal outputs. The monitor circuit can then compare the monitored voltage with the predetermined target value and determine when the monitored voltage equals the predetermined target value. When the monitored voltage equals the predetermined target value, the monitor circuit can then send an output signal to the switch circuit to control the switch circuit to cease driving the at least some of the outputs with the maximum level.

In this way, prior to driving the liquid crystal cells of a set with a video signal, the driving circuit can merely use the switch circuit to drive the appropriate signal outputs with the maximum level. The monitor circuit will then automatically stop operation of the switch circuit so that the relevant signal lines and their associated liquid crystal cells are pre-charged to the appropriate predetermined target value.

Preferably, the switch circuit includes a first switch configured to selectively connect the at least some of the signal outputs to the first level and a second switch configured to selectively connect the at least some of the signal outputs to the second level. The switch circuit can then control the first switch and the second switch. In particular, when the maximum level corresponds to the second level, the first switch does not connect the signal outputs to the first level, but the second switch does connect the signal outputs to the second level. Similarly, when the maximum level corresponds to the first level, the second switch does not connect the signal outputs to the second level, but the first switch does connect the signal outputs to the first level.

Thus, the switch circuit preferably controls the second switch to connect the at least some of the signal outputs to the second level when the common signal has the first level and to control the first switch to connect the at least some of the signal outputs to the first level when the common signal has the second level.

In order to enable the switch circuit conveniently to determine which switches to use, the switch circuit can include an input configured to receive a polarity signal indicating which of the first level and the second level the common signal has.

In this way, according to the polarity signal, the switch circuit can control the first switch and second switch as necessary.

The driving circuit is particularly useful for a liquid crystal display module in which the liquid crystal cells of each respective set are arranged as a plurality of groups, each group forming a display pixel and including a plurality of liquid crystal cells capable of producing a corresponding plurality of colours. In this case, the driving circuit can be configured to use respective signal outputs to change each of the plurality of liquid crystal cells of each respective group consecutively with a common video signal. Thus, within a particular group (and similarly within all other individual groups) each of the liquid crystal cells is driven in turn from a common video signal. To do this, the common video signal may be connected consecutively to the respective signal lines of the liquid crystal cells. At the same time, the driving circuit preferably uses respective signal outputs to charge all of the plurality of groups of liquid crystal cells of a set simultaneously with a respective plurality of video signals. Thus, each group can be provided with its own video signal, that respective video signal including signal components to be provided to respective liquid crystal cells within a group.

The at least some of the signal outputs can thus be those signal outputs required for charging at least the last respective liquid crystal cell to be charged of each group of the plurality of groups of a set.

Within each group, there are a plurality of liquid crystal cells to be charged one after the other. As discussed above, it is the last liquid crystal cell to be charged that has the least amount of time available for its liquid crystal to move. Hence, in one embodiment of the present invention, the pre-charge is applied only to these last liquid crystal cells of all of the groups.

In another embodiment, it is possible to apply pre-charge to all but the first liquid crystal cell to be charged in a group. Hence, the at least some of the signal outputs are then those signal outputs for charging the respective second and subsequent liquid crystal cells to be charged of each group of the plurality of groups of a set.

Of course, it is also possible in some embodiments to apply the pre-charging method to all liquid crystal cells of a set. However, where the pre-charging is not applied to the first liquid crystal cells of the groups, the control circuit can operate the switch circuit at the same time as the driving circuit uses respective signal outputs of the plurality of signal outputs to charge, with respective video signals, the first respective liquid crystal cell to be charged of each group of the plurality of groups of a set.

In this way, it is not necessary to provide additional time during each enabling of a gate line to apply the pre-charge. By applying the pre-charge for second and subsequent liquid crystal cells within a group at the same time as a video signal is written to the first liquid crystal cell of that group, the benefit of pre-charging is available to the second and subsequent liquid crystal cells whilst the first liquid crystal cell still has the same full gate-enabled period in which its liquid crystal can move.

In addition to the pre-charging arrangement considered above, it is also possible to provide a pre-charge circuit for selectively driving the signal outputs with the minimum level. The control circuit can then operate the pre-charge circuit for a respective set for a predetermined time period prior to charging the liquid crystal cells of that set according to video signals with said video signal levels.

It is possible, particularly where polarity is reversed from one frame to another as discussed above, for liquid crystal cells to have in them charge opposite to that to which will be required for any video signal level.

By driving the signal outputs to the minimum level, it is ensured that the liquid crystal cells are pre-charged at least to that minimum level. Of course, this then reduces the amount of charge that need be provided by means of the switch circuit to reach the predetermined target value.

The pre-charge circuit can advantageously drive all of the signal outputs, including the signal outputs for the first of the liquid crystal cells of the groups as discussed above.

A pre-charge pulse can be provided by the control circuit at the start of a gate period in which a gate output drives a respective line to enable a respective set of liquid crystal cells. After that pre-charge pulse, the first liquid crystal cell of each group in the set can be driven with an appropriate video signal whilst subsequent liquid crystal cells in those groups can be driven with the maximum level by means of the switch circuit.

The driving circuit is advantageously used with a liquid crystal display module having a plurality of CS lines corresponding to the plurality of gate lines. Each CS line is connected to each of the liquid crystal cells of a respective set by a plurality of respective CS capacitors. As is well known, the CS capacitors are provided to help compensate for variations in the capacitance of the liquid crystal cells. In this respect, the control circuit is configured to drive the CS lines with a CS signal having substantially the same level as the common signal. Thus, each liquid crystal cell is connected to a corresponding CS capacitor with opposite ends respectively connected to the common signal and the CS signal. Preferably, the pre-charge circuit is configured to drive the signal outputs with the minimum level by connecting the signal outputs to the CS signal.

This is particularly advantageous in charge recycling when the polarity is reversed from one frame to the next and the polarity is reversed from one line to the next. As the driving circuit moves from one line to the next, it is necessary to reverse the level of the CS line. However, the liquid crystal cells to which the signal outputs will be connected by means of the pre-charge circuit will be at a polarity opposite to the previous level of the CS signal. Hence, the liquid crystal cells and the CS signal will help each other in moving towards the new minimum level.

The present invention also provides a liquid crystal module including a driving circuit and a liquid crystal display.

In a preferred embodiment, the driving circuit and liquid crystal display are supported on a common plate, for instance a glass plate. In a further embodiment, the driving circuit and liquid crystal display are formed from low-temperature polysilicon TFT.

The liquid crystal module is particularly advantageous for use in mobile telephones, cameras and other similar small devices.

BRIEF DESCRIPTION OF THE DRAWINGS

FIGS. 6(*a*), (*b*) and (*c*) illustrate various approaches for applying pre-charge to liquid crystal cells;

DETAILED DESCRIPTION OF THE PREFERRED EMBODIMENTS

The invention will be more clearly understood from the following description, given by way of example only, with reference to the accompanying drawings.

Figure 1:
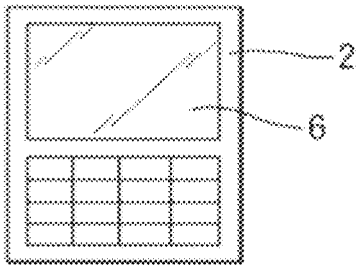
FIG. 1 illustrates a mobile telephone in which the present invention may be embodied.
Figure 2:
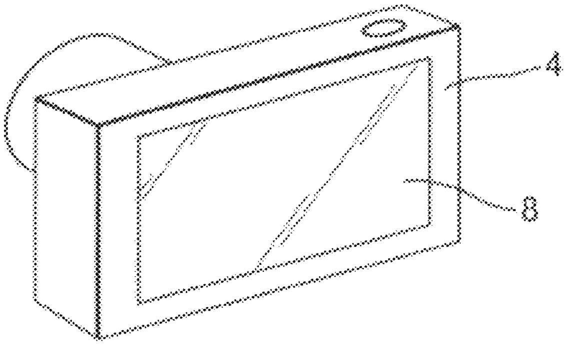
FIG. 2 illustrates a camera in which the present invention may be embodied.

The present invention is applicable to LCD (Liquid Crystal Display) modules such as are used in mobile telephone devices or digital cameras, for instance as illustrated respectively in FIGS. 1 and 2. The present invention could be applied to any LCD, but is particularly intended for and advantageous with LCD driving circuits which are formed on the display panel of the LCD module itself, such that the arrangement is especially advantageous for LCDs of relatively small size, or at least in embodiments where miniaturisation is desired.

In the mobile telephone device 2 of FIG. 1 and the digital camera 4 of FIG. 2, respective LCD modules 6 and 8 are provided for displaying images as required.

Figure 3:
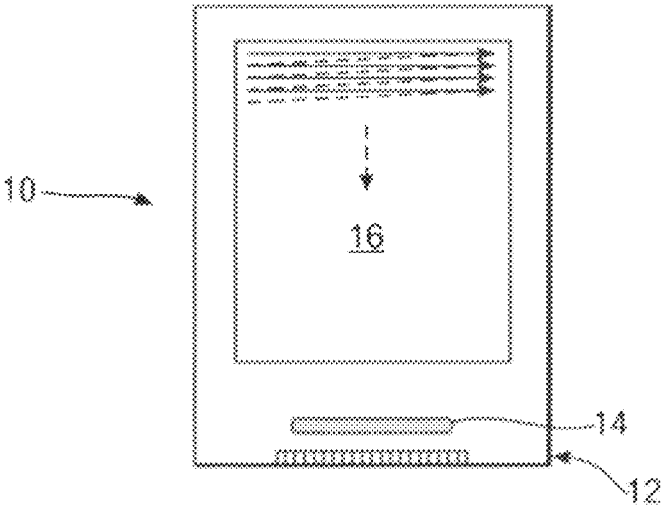
FIG. 3 illustrates a liquid crystal display module in which the present invention may be embodied.

FIG. 3 illustrates an LCD module 10 which is suitable for use in mobile telephone devices and digital cameras and which embodies the present invention.

The LCD module 10 includes at least one plate 12 made of glass (or any other suitable transparent material) against which a liquid crystal display 16 is formed in any known manner. In the illustrated embodiment, a driving circuit 14 is also formed on the glass plate 12. Although the LCD driving circuit 14 is illustrated at a lower portion of the display module 10, a similar driving circuit could be provided at any portion of the glass plate 12 around the display area 16 or, indeed, in a distributed manner around the display area 16.

Figure 4:
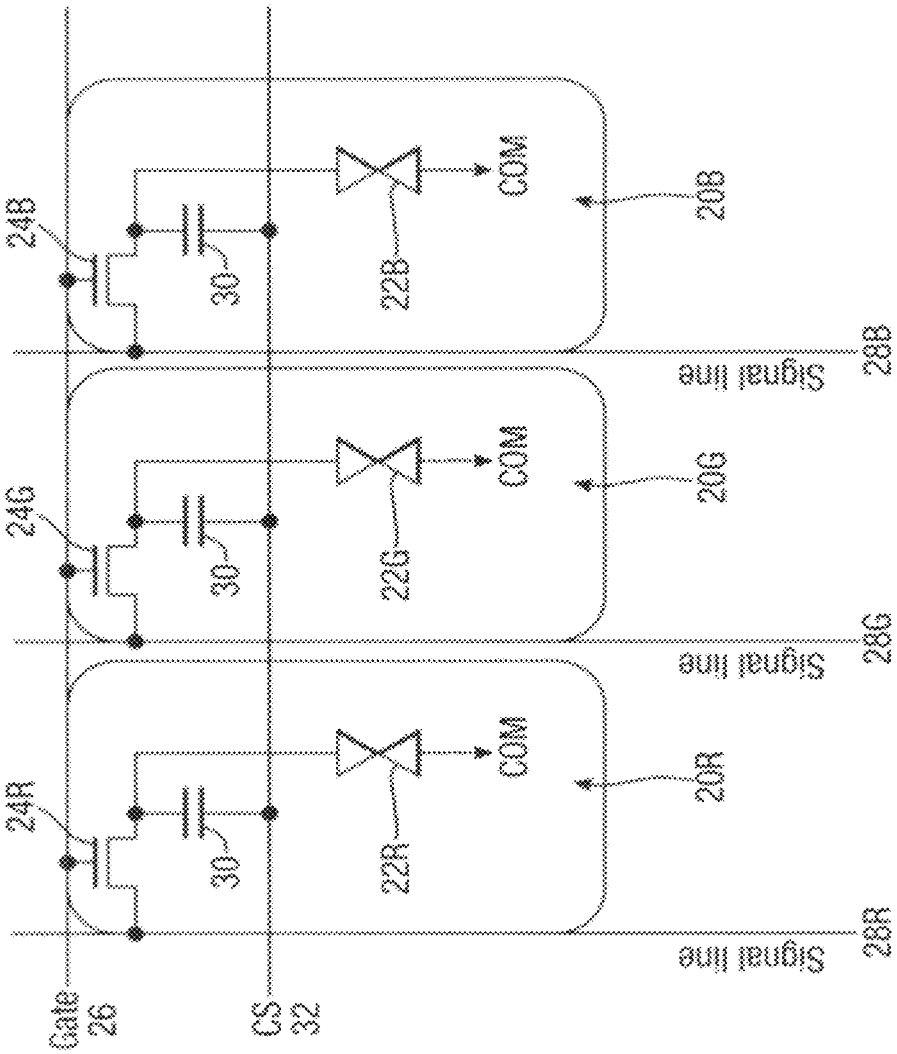
FIG. 4 illustrates schematically three pixel units of a pixel of a liquid crystal display.

FIG. 4 illustrates one example of how the display area 16 can be implemented.

The display area 16 is divided into a two-dimensional array of pixels. The pixels extend in horizontal rows in a first direction and in vertical columns in a second direction. By activating each pixel with a desired colour and brightness, an appropriate image can be displayed on the display 16.

In order to produce a variety of different colours, each pixel includes three pixel units 20R, 20G, 20B respectively for producing red, green and blue. FIG. 4 illustrates the three pixel units 20R, 20G, 20B of a pixel arranged side by side in the first (horizontal) direction. In this respect, it should be appreciated that the three pixel units 20R, 20G, 20B should be located close to one another in order to provide the desired visual combined colour, but the exact positioning of the pixel units is not critical.

Each of the pixel units 20R, 20G, 20B includes a corresponding liquid crystal cell 22R, 22G, 22B. One side of every liquid crystal cell 22R, 22G, 22B is connected to a common line COM which, in the preferred embodiment, is formed as part of the glass plate 12 itself. The opposite side of each liquid crystal cell 22R, 22G, 22B is connected to a respective control transistor or switch 24R, 24G, 24B.

In the illustrated embodiment, all of the switches 24R, 24G, 24B in a row are controlled, in other words switched on or off, by means of a common gate line 26. A respective gate line is provided for each of the rows of the display 16. On the other hand, the inputs to the switches 24R, 24G, 24B are connected to signal lines 28R, 28G, 28B. In particular, all of the red pixel units 20R in the same column are connected to a single respective signal line 28R, all of the green pixel units 20G in the same column are connected to a single respective signal line 28G and all of the blue pixel units 20B in the same column are connected to a single respective signal line 28B.

In order to display an image on the display area 16 of the LCD module 10, an image is provided row by row. A particular gate line 26 is driven to a voltage so as to turn on all of the switches or transistors 24R, 24G, 24B in its respective row. While that gate line enables that particular row or horizontal line, first all of the red signal lines 28R are used to drive all of the red liquid crystal cells 22R in that row, then all of the green signal lines 28G are used to drive all of the green LCD cells 22G in that particular row and, finally, all of the blue signal lines 28B are used to drive all of the blue liquid crystal cells 22B in that particular row. Preferably, all of the pixel units 20R, 20G, 20B of a particular colour are driven simultaneously. However, other arrangements are also possible.

With one row or horizontal line written, the corresponding gate line 26 is driven to a voltage to turn off all of its corresponding switches or transistors 24R, 24G, 24B and another gate line is driven to a voltage to turn on its corresponding switches. In the preferred embodiment, adjacent gate lines 26 are driven one after the other. However, other arrangements are possible. It will also be appreciated that different arrangements of arrays of pixel units can be provided to achieve the same effect.

In practice, the liquid crystal capacitance is somewhat variable and it becomes difficult, with only the arrangement described above, to drive reliably the liquid crystal cells 22R, 22G, 22B to the appropriate or desired brightness levels. To help compensate for the variability of the liquid crystal cells 22R, 22G, 22B, CS capacitors 30 are provided in parallel with the liquid crystal cells 22R, 22G, 22B. As illustrated, the CS capacitors 30 are provided between the signal driving end of the liquid crystal cells 22R, 22G, 22B and a CS line 32. For the arrangement described above, a CS line 32 is provided for each respective row or horizontal line. Thus, the CS capacitors 30 of all of the pixel units 20R, 20G, 20B of a respective row or horizontal line are connected to a corresponding respective CS line 32.

The CS line 32 is driven with a voltage corresponding closely to the voltage of the common voltage COM. In this way, variations in the capacitance of the liquid crystal cells 22R, 22G, 22B have less effect on driving of those liquid crystal cells 22R, 22G, 22B.

Figure 5:
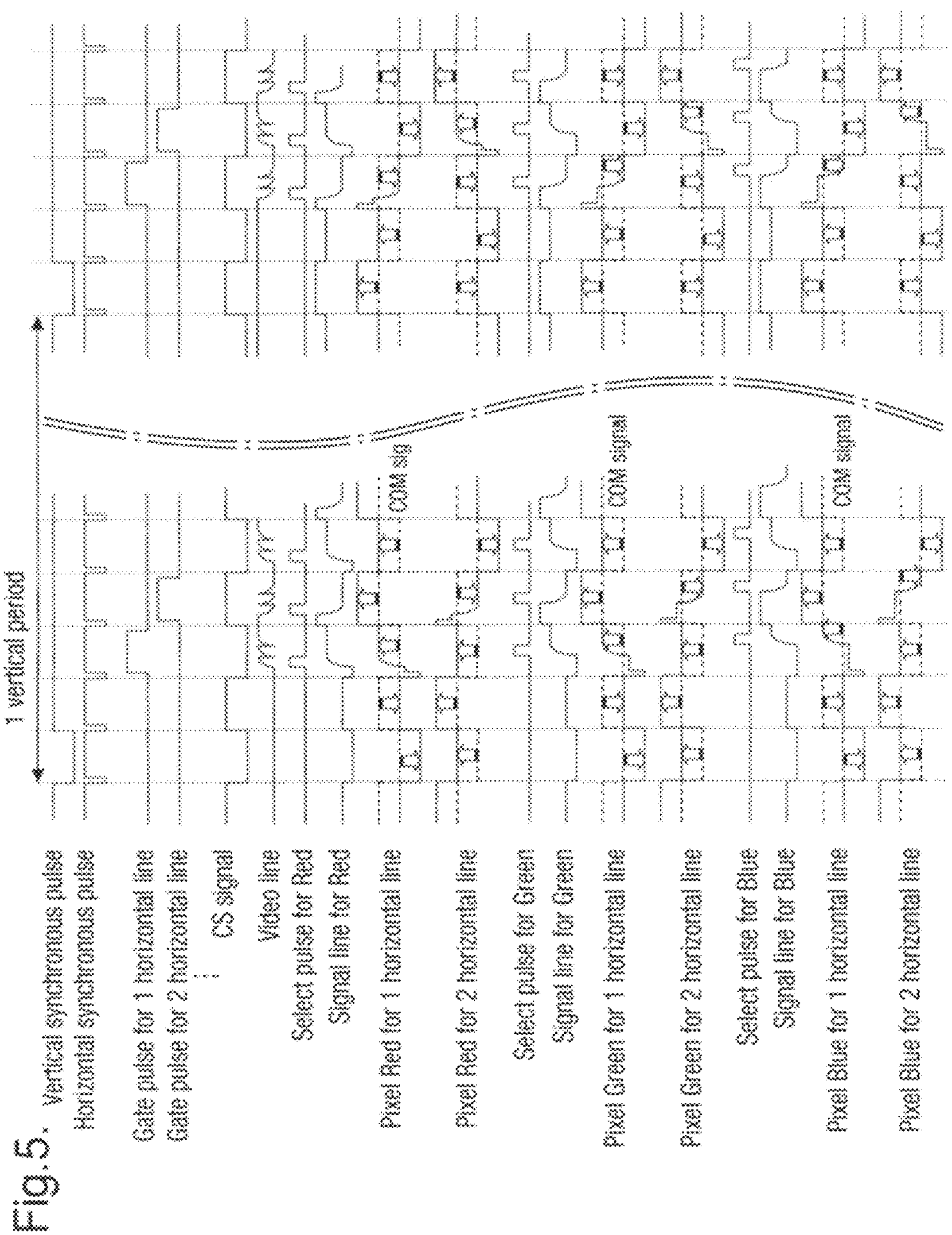
FIG. 5 illustrates the timing of signals for driving the pixel units of FIG. 4.

FIG. 5 illustrates various signals for driving the first two horizontal lines of the display 16. In this regard, it is worth noting that, for ongoing operation of the liquid crystal display 16, it is necessary to reverse the polarity applied to the liquid crystal cells 22R, 22G, 22B each time they are used. Hence, after each frame is displayed on the display 16, in other words after each vertical period, the polarity is reversed. Also, adjacent horizontal lines or rows are driven with opposite polarities.

As illustrated in FIG. 5, a vertical synchronous pulse having the length of one horizontal timing signifies a new frame. Also, a short horizontal synchronous pulse is provided to indicate each new horizontal line or row.

Gate pulses are shown for the first and second horizontal lines. Each gate pulse lies within the horizontal line period and, during a gate pulse, the respective row or horizontal line of pixel units 20R, 20G, 20B are enabled in the manner described above. Thus, during the gate pulse for the first horizontal line, all of the switches/transistors 24R, 24G, 24B of the first horizontal line are enabled, but none others. Similarly, for the second horizontal gate pulse, only the switches/transistors of the second row or horizontal line are enabled.

In FIG. 5, the voltages for a red pixel unit 20R, a green pixel unit 20G and a blue pixel unit 20B are indicated for first and second horizontal lines. The COM signal is illustrated as a dashed line overlying the voltage illustrated for the liquid crystal cells 22R, 22G, 22B of the pixel units 20R, 20G, 20B. As illustrated, from one horizontal line to the next, the COM signal changes from one voltage state to another. In this way, the polarity applied to adjacent horizontal rows of pixels is reversed. As also illustrated, for the second vertical period (on the right side of FIG. 5), the COM signal is reversed as a whole such that the pixels of a horizontal line are driven with opposite polarity from frame to frame.

The CS signal follows the COM signal with generally the same voltage.

In a preferred embodiment, the COM signal and CS signal change state between zero volts and approximately 5 volts.

Within each horizontal period, respective select pulses are provided for the red pixel units 20R, green pixel units 20G and blue pixel units 20B. In this way, a common video line can be provided for one pixel, that video line including consecutively the driving signal required for the red pixel unit 20R, green pixel unit 20G and blue pixel unit 20B of the same pixel.

The select pulses illustrated in FIG. 5 are used to apply appropriate portions of the video line signal to the respective red, green and blue pixel units 20R, 20G, 20B. As a result, during a particular respective select pulse, the signal line for the respective pixel unit 20R, 20G, 20B is driven to the required voltage provided by the common video line signal at that time.

Unfortunately, at low temperatures, the movement of the liquid crystal becomes slow. As a result, even though a signal line 28R, 28G, 28B applies a required signal to a respective liquid crystal cell 22R, 22G, 22B of a pixel unit 20R, 20G, 20B, the liquid crystal may move too slowly to reach the brightness/intensity intended by the signal. On the other hand, it may be necessary to charge with a larger voltage level at the actual data writing time. This requires a higher specification digital-to-analog converter using larger bias current.

In the embodiment as described so far, the deterioration in picture quality would occur mostly to the blue pixel units 20B and to a lesser degree to the green pixel units 20G.

During the select pulse for red, the video line signal is applied to the signal line 28R for red so as to drive the red pixel units 20R of the enabled horizontal line. However, after the select pulse for red has finished, the COM and CS signals remain where they are, such that movement of the liquid crystal can continue. In other words, the red pixel units 20R have the remainder of that horizontal period in which the liquid crystal can move. Because the select pulse for green occurs after the select pulse for red and later in the horizontal period, the green pixel units 20G have less time available for movement of the liquid crystal. Similarly, with the select pulse for blue after the select pulse for green, the blue pixel units 20B have even less time for the liquid crystal to move. At the end of the horizontal period in question, the COM and CS signals change in polarity such that further movement of liquid crystal ceases. It will be appreciated that, therefore, the green and, to a greater extent, the blue colours deteriorate at low temperature.

To reduce these problems, it is proposed to apply a pre-charge to the liquid crystal cells 22R, 22G, 22B of the pixel units 20R, 20G, 20B. In other words, in advance of applying the desired video signal to the liquid crystal cell 22R, 22G, 22B of a pixel unit 20R, 20G, 20B, a signal is applied to that liquid crystal cell 22R, 22G, 22B so as to move it in the direction of the expected video signal.

A first possible method is described with reference to FIG. 6(*a*). In particular, the CS voltage is applied to the liquid crystal cells 22R, 22G, 22B of each horizontal line in advance of the signal pulses.

As illustrated, the LCD drive circuit 14 generates a pre-charge pulse at the beginning of a horizontal period. In response to the pre-charge pulse, the CS signal is connected to the input side of the liquid crystal cells 22R, 22G, 22B.

As explained previously, the polarity of each pixel unit 20R, 20G, 20B is reversed from one vertical period to the next. Hence, the liquid crystal cell 22R, 22G, 22B of an individual pixel unit 20R, 20G, 20B will still have the remanence of an opposite charge to the polarity provided by the CS signal. Thus, as illustrated in FIG. 6(*a*), at the time of the start of the pre-charge pulse, the pixel unit 20R, 20G, 20B will be negatively charged whereas the CS signal will be at zero volts. During the pre-charge pulse, the pixel charge will be brought up to zero volts such that when the signal pulse is applied with the select pulse, the signal pulse only has to raise the pixel unit voltage from zero volts and not from its previous negative volts.

As illustrated, the necessary drive circuitry can be provided either on the glass plate 12 itself or as part of an external IC 18. Because the CS voltage is used, very little extra circuitry is required and, hence, there is little increase in cost.

A second method is described with reference to FIG. 6(*b*). In this arrangement, the LCD driving circuit 14 can be adapted so as to provide the signal intended for one pixel unit 20R of a pixel simultaneously also to the other two pixel units 20G, 20B of that pixel. In particular, for the example given above, at the time of applying the signal line for the red pixel unit 20R, that same signal is simultaneously applied to the green pixel unit 20G and to the blue pixel unit 20B. Thus, referring to the timing diagram of FIG. 6(*b*), a pre-charge pulse is generated by the LCD driving circuit 14 which at least overlaps with, but is preferably coterminous with, the first select pulse for the horizontal period in question. Thus, for the example given above, the pre-charge pulse occurs at the same time as the select pulse for red. In response to this pre-charge pulse, the LCD driving circuit 14 applies the video signal to one or both of the other pixel units 20G, 20B in the same pixel. The timing diagram of FIG. 6(*b*) is based on the select pulse being the select pulse for blue as described above and for the situation where the blue signal part of the video signal happens to be the same as the red signal part of the video signal. Thus, during the pre-charge pulse, the red signal is applied not only along the red signal line 28R, but also to the blue liquid crystal cell 22B such that the blue liquid crystal cell 22B is raised to the same voltage as the red liquid crystal cell 22R. In this way, in the illustrated embodiment, when the select pulse for the blue pixel unit 20B enables the blue signal part of the video signal to be provided on the blue signal line 28B, the charge on the blue pixel unit 20B is already at an appropriate level and its liquid crystal cell 22B has had extra time in which to move.

Where the signal parts of the video signal for the three colours are not the same, they will still have an effect on starting movement of the liquid crystal in advance of the required respective signal being applied to the cells.

Unfortunately, this arrangement can still result in picture deterioration, particularly resulting from images where the different colour signal parts of the video signal are very different. For example, where a pure blue area is to be displayed the red signal part of the video signal will be zero and so will have no greater effect than the CS line voltage. Also, the digital-to-analog conversion circuit for providing the first of the three signals actually has to provide additional charge (as part of the pre-charge process) to one or both of the remaining pixel units 20G, 20B. In this way, the power consumption is increased.

As illustrated in FIG. 6(*b*), this arrangement does have the advantage that the digital-to-analog circuitry can still be implemented on an external driving IC 18 or on the glass plate 12 itself.

A third method is proposed in which a pre-charge is applied to bring the liquid crystal cells 22R, 22G, 22B to a voltage midway between the COM voltage and the maximum signal voltage. In this respect, liquid crystal has most sensitivity at this mid-point. It is proposed that applying such a pre-charge voltage level is the most effective way to cancel low-temperature picture deterioration.

The middle voltage level is not otherwise required in the LCD driving circuit 14 or module 10 and, hence, is not available without providing additional circuitry. In particular, to provide the middle voltage level, the LCD driving circuit 14 would be provided with an analog amplifier or a DC-to-DC converter.

In this third arrangement, the pre-charge process occurs independently of the signal applied to the first of the three colours. As illustrated in FIG. 6(*c*), a pre-charge pulse is generated by the drive circuitry 14 at the beginning of each horizontal period. The drive circuitry 14 includes appropriate features, for instance implementing an analog amplifier 14*a* or a DC-to-DC converter 14*b*, which provides a voltage midway between the COM voltage and the maximum signal voltage. Thus, for the horizontal period illustrated in FIG. 6(*c*) where the COM voltage is zero volts and the maximum signal voltage is 5 volts, during the pre-charge pulse, the drive circuit 14 applies a voltage of 2.5 volts to the liquid crystal cells 22R, 22G, 22B being subjected to pre-charge. Hence, as illustrated, the pixel voltage rises during the pre-charge pulse period to the mid-point voltage, thereby giving the liquid crystal extra time to move in advance of the select pulse. As illustrated, during the select pulse, the appropriate signal is applied as described previously with reference to FIG. 5. Of course, for horizontal periods having a COM signal of +5 volts, a negative-polarity signal is applied to the liquid crystal cells which extends from +5 volts in a negative direction to a "maximum" amount of zero volts. Hence, during such a horizontal period, it is necessary to apply a pre-charge voltage of 2.5 volts.

In preferred embodiments, the liquid crystal module 10 is implemented with low-temperature polysilicon TFT. Using low-temperature polysilicon TFT, it is possible to implement the driving circuit 14 on the glass plate 12 of the LCD module 10 with the low-temperature polysilicon TFT. The driving circuit 14 can also be formed as part of the same process for forming the display 16. However, low-temperature polysilicon TFT inherently creates a wide variation in the characteristics of circuitry produced with it, for instance voltage level thresholds. It is therefore impossible, or at least very difficult, to provide an appropriate analog amplifier on the glass plate 12 itself as part of the low-temperature polysilicon TFT. Hence, as illustrated to the left in FIG. 6(*c*), at least the analog amplifier 14*a* of the driving circuit 14 has to be provided separately from the glass plate 12.

Irrespective of where the analog amplifier is provided, it results in increased power consumption, especially because pre-charge must be done in a short time.

Although (as illustrated to the right in FIG. 6(*c*)) a DC-to-DC converter 14*b* could be implemented on the glass plate 12 itself, for instance as part of a low-temperature polysilicon TFT manufacturing process, it increases the need for external components such as capacitor 14*c*. It also increases the glass plate 12 or external IC size.

It is now proposed to provide an arrangement in the driving circuit 14 of the LCD module 10 that can drive the liquid crystal cells 22R, 22G, 22B with a mid-point pre-charge voltage without using an analog amplifier or a DC-to-DC converter and, hence, avoiding the problems discussed above.

Figure 7A:
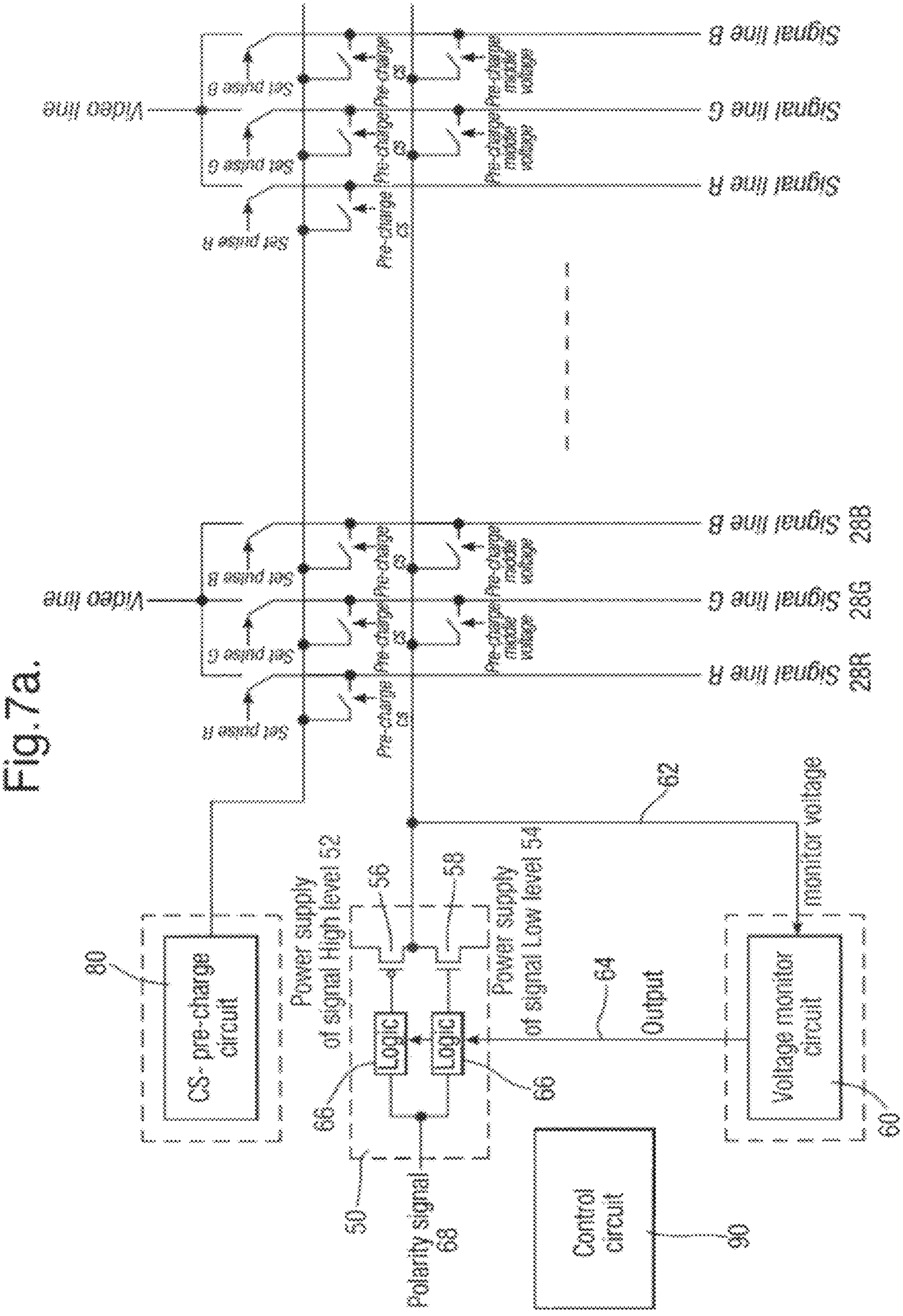
FIGS. 7(*a*) and (*b*) illustrate schematically relevant components of a driving circuit embodying the present invention.
Figure 7B:
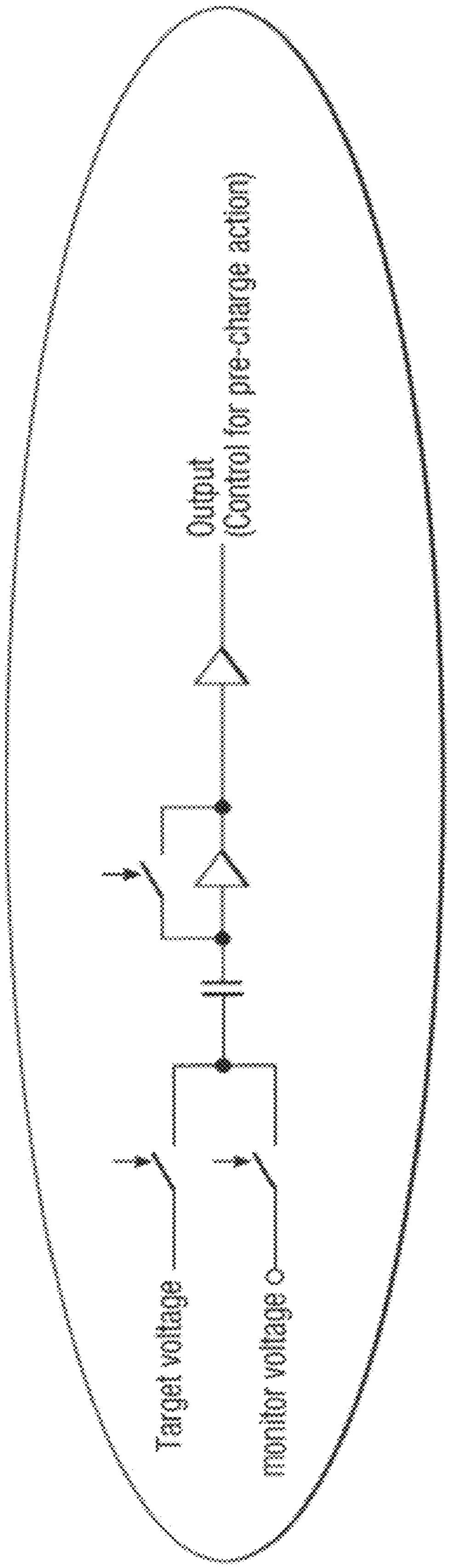

FIGS. 7(*a*) and (*b*) illustrate schematically an example of an appropriate arrangement for the driving circuit 14.

A switch circuit 50 is able to connect selectively the required signal lines 28G, 28B to either the high-level power supply 52 (plus 5 volts in the example given above) available from the driving circuit 14 or the low-level power supply 54 (0 volts in the example given above) available from the driving circuit 14. In the illustrated example, respective switches or transistors 56, 58 are controlled to connect the signal lines 28 to either the high-level power supply 52 or low-level power supply 54.

It will be appreciated that the signal lines 28R, 28G, 28B and subsequent lines and components leading to and including the liquid crystal cells 22R, 22G, 22B all have some capacitance. Hence, having connected the signal lines 28R, 28G, 28B to either the high-level power supply 52 or low-level power supply 54, the voltage on the signal lines 28R, 28G, 28B will not rise or fall immediately to the power supply level to which they are connected.

According to the proposed arrangement, a voltage monitor circuit 60 is provided as part of the driving circuit 14 for monitoring the voltage on the signal lines 28G, 28B. A monitor voltage line 62 connects the signal lines 28G, 28B to the voltage monitor circuit 60. After the signal lines have been connected to either the high-level or the low-level power supply 52, 54, the voltage monitor circuit 60 is configured to monitor the resulting voltage on the signal lines 28G, 28B and, in particular, determines when that voltage reaches the required mid-point voltage. At that point, the voltage monitor circuit 60 can control the switch circuit 50 so as to disconnect the signal lines 28G, 28B from either the high-level power supply 52 or the low-level power supply 54. Thus, a mid-point voltage can be applied as a pre-charge to liquid crystal cells 22.

An output line 64 connects the voltage monitor circuit 60 to the switch circuit 50. In the illustrated embodiment, the output line 64 connects to logic elements 66 in the switch circuit 50 which control the switches 56 and 58 to disconnect the signal lines 28 from the high-level power supply 52 and low-level power supply 54.

The switch circuit 50 also receives a polarity signal on a polarity line 68. This indicates the polarity of the current horizontal period and is used to control to which of the high-level power supply 52 and low-level power supply 54 the signal lines 28 are connected. In the illustrated embodiment, the polarity signal on the polarity line 68 is used to control which of the switches 56 and 58 are turned on. This can be implemented, as illustrated, by providing the polarity signal to the logic elements 66. One or other of the logic elements 66 is enabled according to the polarity signal. The enabled logic element 66 may then be controlled by the voltage monitor circuit 60 via the output line 64.

FIG. 7(*b*) illustrates schematically an implementation of the voltage monitor circuit 60.

The circuit alternates between a compensate state and a compare state. In the compensate state, the target voltage is connected to the circuit and the inverter is turned on. The left side of the capacitor is presented with the target voltage whereas the right side of the capacitor is presented with the threshold voltage of the inverter. When the target voltage is disconnected from the capacitor and the inverter is switched off, the capacitor stores an offset voltage. The circuit is then switched to the compare state in which the monitor voltage is connected to the capacitor. If the monitor voltage is lower than the target voltage, the circuit outputs a "Low" signal, but if the monitor voltage is equal to or higher than the target voltage, the output changes form "Low" to "High" and indicates that the power supply should be disconnected.

As illustrated, a control circuit 90 may be provided for controlling the various elements described above.

Figure 8:
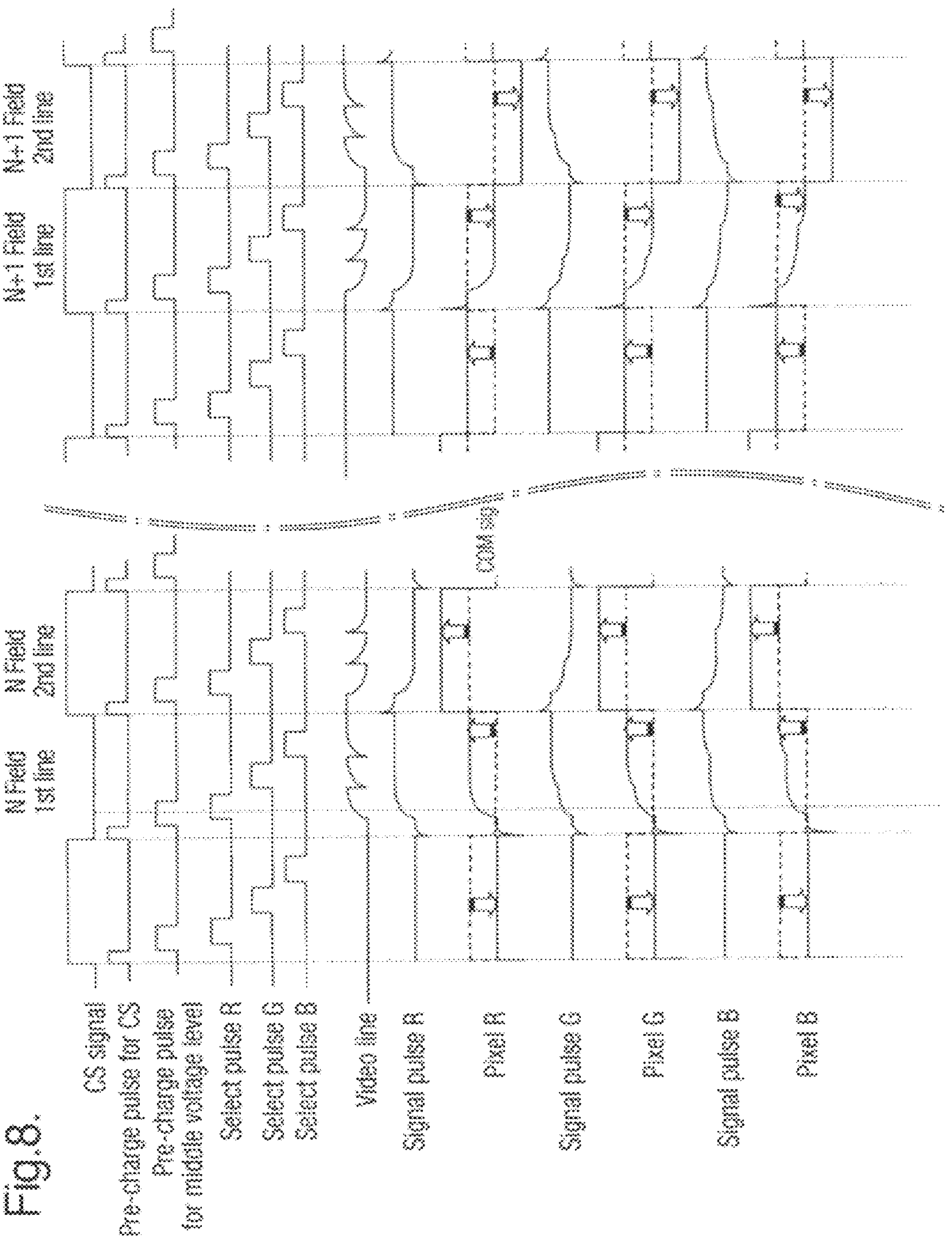
FIG. 8 illustrates the timings of various signals for applying pre-charge to the pixel units of FIG. 4 in accordance with the present invention.

FIG. 8, like FIG. 5, illustrates the timing of various signals for the beginning of two consecutive vertical periods.

As explained above with reference to FIG. 6(*c*), a pre-charge pulse (for applying a middle voltage level) is applied towards the beginning of each line or horizontal period.

In the illustrated embodiment, it is assumed that the first colour to have its signal applied, in this case red, does not need the middle voltage pre-charge. This is because, for the reasons explained above, the first signal has available to it the rest of the horizontal line in which the liquid crystal can move. Hence, in the illustrated embodiment, only the green signal line 28G and blue signal line 28B are connected to the output of the switch circuit 50 and monitor voltage line 62 the pre-charge pulse for middle voltage level is applied at the same time as the select pulse for the first colour, e.g. red.

In the illustrated embodiment, during the pre-charge pulse for middle voltage, a signal pulse is applied to all of the subsequent liquid crystal cells 20G, 20B, in this case green and blue, such that those cells 20G, 20B are brought to the middle voltage. In the illustrated embodiment, the select pulse for the first of the colours, in this case, red, is applied such that all of the first colour liquid crystal cells 20R have the video signal applied and the appropriate signal voltage applied. Subsequently, during the select pulses for the other two colours, the respective liquid crystal cells 20G, 20B have the appropriate video signal applied to them. As illustrated, it is only necessary to apply charge to move them from the middle voltage to the required signal level.

The timing diagram of FIG. 8 also includes an illustration of a pre-charge pulse for the CS signal. In this respect, the driving circuit 14 can additionally include a CS pre-charge circuit 80 as illustrated in FIG. 7(*a*). As illustrated, this is selectively connected to all of the signal lines 28R, 28G, 28B.

As described with reference to FIG. 6(*a*), it is possible to apply to all of the liquid crystal cells 20R, 20G, 20B of a horizontal line the CS voltage being used for the line in question. In response to the pre-charge pulse for CS illustrated in FIG. 8, the CS pre-charge circuit 80 is configured to apply to the signal lines 28 of all pixel units 20R, 20G, 20B of a horizontal line the CS level for the horizontal line about to be written.

As illustrated in FIG. 8, during the pre-charge pulse for CS, the liquid crystal cells 22R, 22G, 22B of all of the pixel units 20R, 20G, 20B are brought to the CS voltage. In other words, as illustrated, any remaining charge from the previous frame having opposite polarity to the frame in question, is removed.

This arrangement is highly advantageous in reducing the overall power consumption of the device.

Considering an example where the CS voltage is plus 5 volts for a line of a frame and zero volts for the next frame, then the signals on that line for the first of those frames will be of negative polarity. At the start of the second of those frames, the driving circuit 14 will be moving the CS signal voltage from plus 5 volts to zero volts and the charge on the liquid crystal cells 22R, 22G, 22B will be negative with respect to the intended zero volt CS level. By applying the CS line to the liquid crystal cells 22R, 22G, 22B of the pixel units 20R, 20G, 20B at the start of a horizontal line, charge recycling occurs, whereby the negative charge on the liquid crystal cells 22R, 22G, 22B actually help in bringing the CS signal level voltage down to its intended voltage of zero volts.

It will be appreciated (and seen from FIG. 8) that the reverse is true when the CS signal returns to plus 5 volts for the next frame. The liquid crystal cells 22R, 22G, 22B will have a positive charge resulting from the previous positive polarity signal and, hence, help to pull the CS voltage from zero volts to plus 5 volts.

We claim:

1. A driving circuit for a liquid crystal display module having an array of liquid crystal cells connected to a common line, a plurality of gate lines and a plurality of signal lines, each gate line being arranged to selectively enable a respective set of the liquid crystal cells such that signal lines connected to respective liquid crystal cells of a set can be used to charge respective liquid crystal cells of that set when that set is enabled by the respective gate line, the driving circuit including:

a common output configured to drive the common line with a common signal having selectively one of a first level and a second level;

a plurality of gate outputs configured to drive the gate lines so as to selectively enable the respective sets of liquid crystal cells; and a plurality of signal outputs configured to charge liquid crystal cells with video signal levels varying between a minimum level and a maximum level wherein, when the common signal has the first level, the minimum level is the first level and the maximum level is the second level and, when the common signal has the second level, the minimum level is the second level and the maximum level is the first level; wherein the driving circuit further includes:

a switch circuit configured to selectively drive at least some of the signal outputs with the maximum level;

a monitor circuit configured to monitor the voltage on the at least some of the signal outputs and to control the switch circuit to cease driving the at least some of the signal outputs with the maximum level when the monitored voltage reaches a predetermined target value intermediate the minimum level and the maximum level; and a control circuit configured to pre-charge liquid crystal cells by operating the switch circuit for the at least some of the signal outputs prior to charging the liquid crystal cells according to video signals with said video signal levels.

2. A driving circuit according to claim 1 wherein the monitor circuit is connected to the switch circuit and to the at least some of the signal outputs and wherein the monitor circuit is configured to compare the monitored voltage with the predetermined target value, to determine when the monitored voltage equals the predetermined target value and, when the monitored voltage equals the predetermined target value, to send an output signal to the switch circuit to control the switch circuit to cease driving the at least some of the signal outputs with the maximum level.

3. A driving circuit according to claim 1 wherein the switch circuit includes a first switch configured to selectively connect the at least some of the signal outputs to the first level and a second switch configured to selectively connect the at least some of the signal outputs to the second level wherein the switch circuit is configured to control the first switch and the second switch.

4. A driving circuit according to claim 3 wherein the switch circuit is configured to control the second switch to connect the at least some of the signal outputs to the second level when the common signal has the first level and to control the first switch to connect the at least some of the signal outputs to the first level when the common signal has the second level.

5. A driving circuit according to claim 4 wherein the switch circuit includes an input configured to receive a polarity signal indicating which of the first level and the second level the common signal has.

6. A driving circuit for a liquid crystal display module according to claim 1 in which the liquid crystal cells of each respective set are arranged as a plurality of groups, each group forming a display pixel and including a plurality of liquid crystal cells capable of producing a corresponding plurality of colours; wherein the driving circuit is configured to use respective signal outputs to charge each of the plurality of liquid crystal cells of each respective group consecutively with a common video signal and to charge all of the plurality of groups of liquid crystal cells of a set simultaneously with a respective plurality of video signals.

7. A driving circuit according to claim 6 wherein the at least some of the signal outputs are the signal outputs for charging at least the last respective liquid crystal cell to be charged of each group of the plurality of groups of a set.

8. A driving circuit according to claim 6 wherein the at least some of the signal outputs are the signal outputs for charging the respective second and subsequent liquid crystal cells to be charged of each group of the plurality of groups of a set.

9. A driving circuit according to claim 6 wherein the control circuit is configured to operate the switch circuit at the same time as the driving circuit uses respective signal outputs of the plurality of signal outputs to charge, with respective video signals, the first respective liquid crystal cell to be charged of each group of the plurality of groups of a set.

10. A driving circuit according to claim 1 further including:

a pre-charge circuit configured to selectively drive the signal outputs with the minimum level; wherein the control circuit is configured to operate the pre-charge circuit for a respective set for a predetermined time period prior to charging the liquid crystal cells of that set according to video signals with said video signal levels.

11. A driving circuit according to claim 10 for a liquid crystal display module having a plurality of CS lines corresponding to the plurality of gate lines, each CS line being connected to each of the liquid crystal cells of a respective set by a plurality of respective CS capacitors; wherein the control circuit is configured to drive the CS lines with a CS signal having substantially the same level as the common signal; and the pre-charge circuit is configured to drive the signal outputs with the minimum level by connecting the signal outputs to the CS signal.

12. A driving circuit according to claim 1 for a liquid crystal display module in which the respective sets of liquid crystal cells are arranged side by side; wherein the driving circuit is configured to use the plurality of gate outputs so as to enable adjacent sets of liquid crystal cells consecutively one after the other and to alternate the common signal between the first level and the second level for adjacent sets of liquid crystal cells.

13. A driving circuit according to claim 1 wherein the driving circuit is configured to alternate the common signal between the first level and the second level for consecutive uses of the array of liquid crystal cells such that, when each one of the gate lines is used to enable a respective set of liquid crystal cells, the common signal will have a different one of the first level and the second level to when that one of the gate lines was previously used to enable the respective set of liquid crystal cells.

14. A liquid crystal module including a driving circuit according to claim 1 and a liquid crystal display.

15. A liquid crystal module according to claim 14 wherein the driving circuit and the liquid crystal display are supported on a common plate.

16. A liquid crystal module according to claim 15 wherein the display circuit and the liquid crystal display are constructed from low-temperature polysilicon TFT.

17. A mobile telephone including a liquid crystal module according to claim 14.

18. A camera including a liquid crystal module according to claim 14.

19. A method of driving a liquid crystal display having an array of liquid crystal cells connected to a common line, a plurality of gate lines and a plurality of signal lines, each gate line being arranged to selectively enable a respective set of the liquid crystal cells such that signal lines connected to respective liquid crystal cells of a set can be used to charge respective liquid crystal cells of that set when that set is enabled by the respective gate line, the method including:

driving the common line with a common signal having selectively one of a first and a second level;

driving the gate lines so as to selectively enable respective sets of liquid crystal cells;

charging liquid crystal cells according to video signal levels varying between a minimum level and a maximum level, wherein, when the common line is driven with a common signal having the first level, the minimum level is the first level and the maximum level is the second level and, when the common line is driven with a common signal having the second level, the minimum level is the second level and the maximum level is the first level;

pre-charging liquid crystal cells connected to at least some of the signal lines prior to charging those liquid crystal cells according to the video signal levels by driving the at least some of the signal lines with the maximum level, monitoring the voltage on the at least some of the signal lines and ceasing driving the at least some of the signal lines with the maximum level when the monitored voltage reaches a predetermined target value intermediate the minimum level and the maximum level.

* * * * *